July 9, 1963
N. D. BAIN
3,097,012
COLLAPSIBLE VEHICLE LOAD BED SIDES
Filed Jan. 9, 1962
2 Sheets-Sheet 1
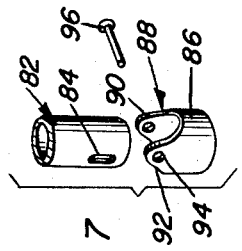
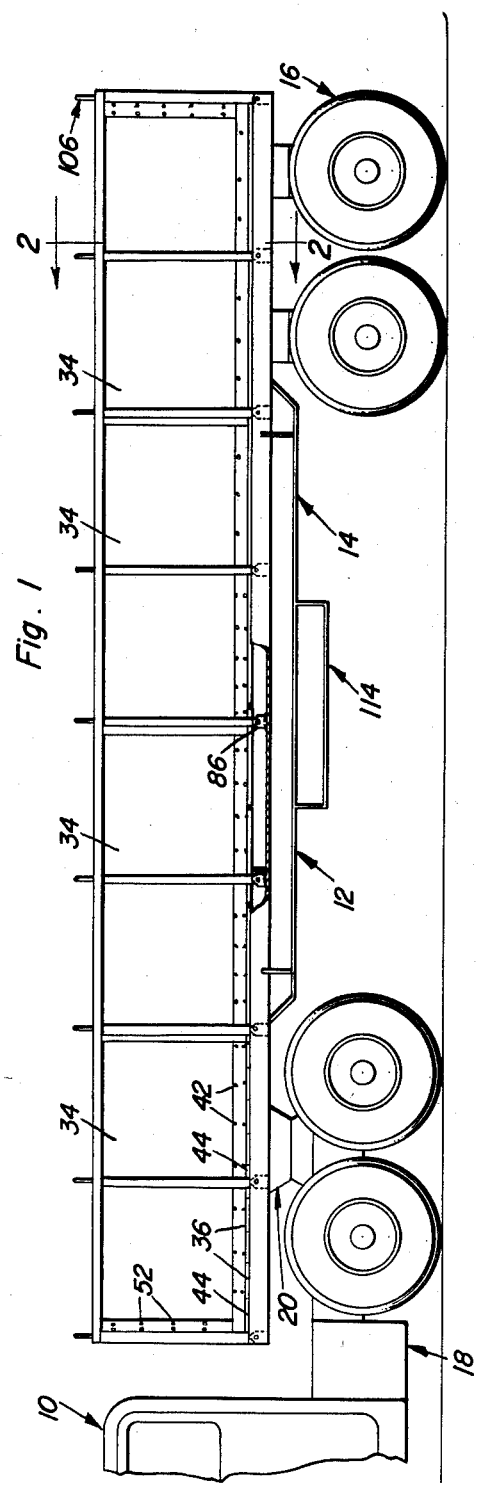
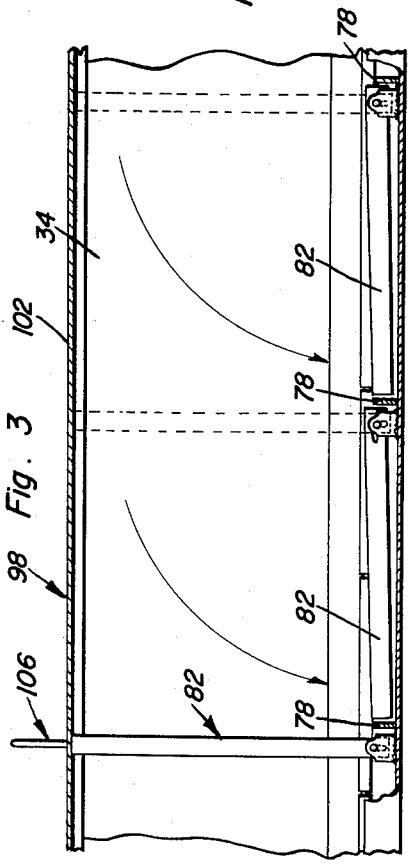
Norman D. Bain
INVENTOR.
BY *Clarence A. O'Brien*
*and Harvey B. Jackson*
Attorneys

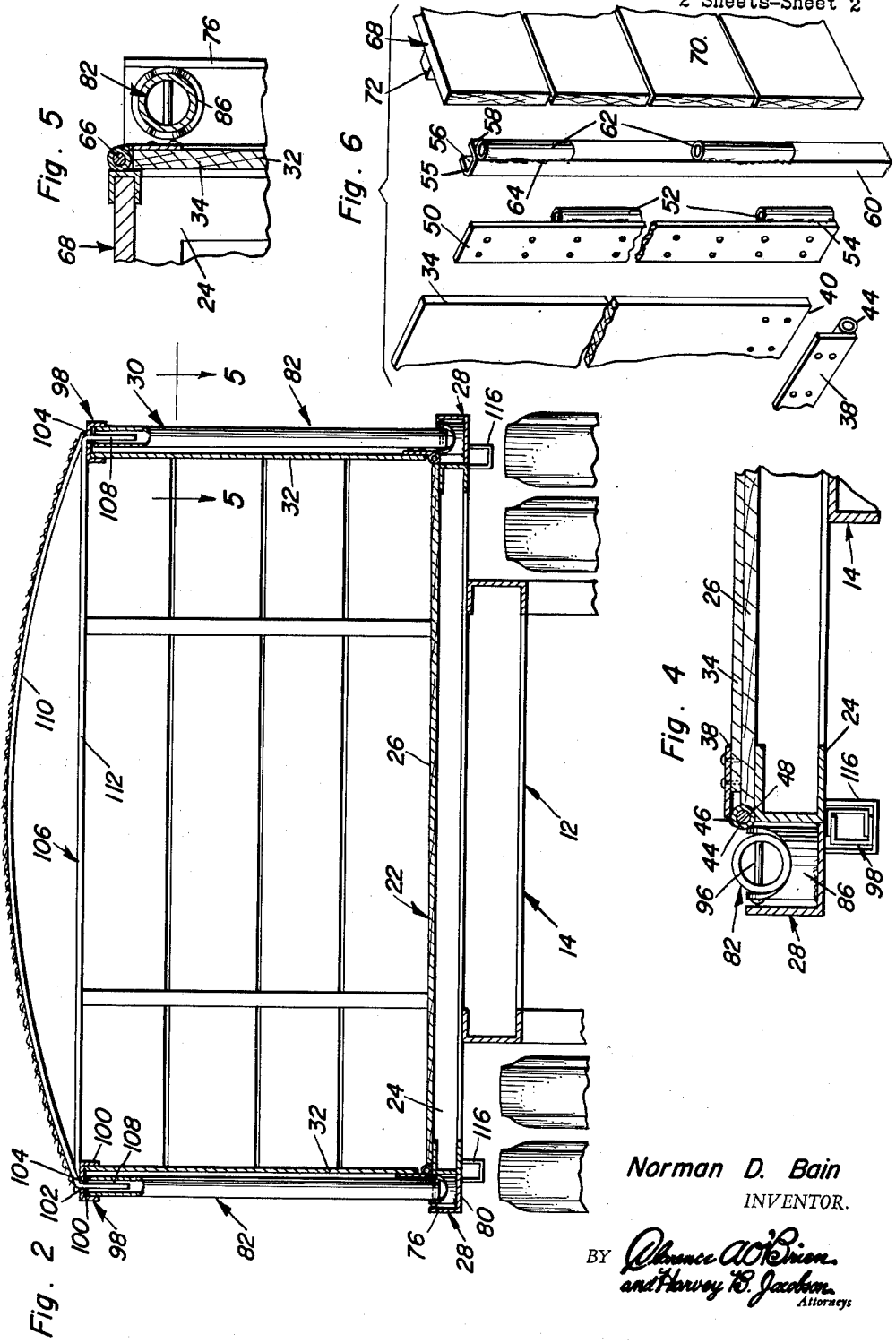

United States Patent Office 3,097,012
Patented July 9, 1963

3,097,012
COLLAPSIBLE VEHICLE LOAD BED SIDES
Norman D. Bain, Zephyr, Tex.
(P.O. Box 942, Lubbock, Tex.)
Filed Jan. 9, 1962, Ser. No. 165,105
16 Claims. (Cl. 296—10)

This invention relates to a novel and useful load bed side assembly which is adapted to be utilized in converting any conventional type of flat load bed to an upwardly opening receptacle type of vehicle body.

The load bed side assembly of the instant invention includes a pair of elongated longitudinally extending opposite side panels and the side panels are pivotally secured along corresponding side edge portions thereof to the opposite side edge portions of the flooring of the vehicle load bed for movement between lowered positions overlying the corresponding side portions of the flooring and raised positions with the free edge portions of the side panels elevated above the flooring to form upstanding sides. Retractable side posts are provided and are strategically positioned at spaced points along each side of the vehicle flooring and are utilized to brace the opposite side panels of the load bed assembly. The side posts each have one end pivotally secured to the corresponding side edge of the flooring for movement about an axis extending transversely of the axis of rotation of the corresponding side panel between a lowered position paralleling and disposed along one side of the flooring and a raised position with the free end thereof elevated above the flooring. Suitable top bow members are removably secured between side posts carried by opposite sides of the flooring and thus the side panels have transverse bracing provided which extends therebetween. In addition, the corresponding end edge portions of the side panels include end gate support means which are removably engageable with end gate members for securement of the latter in upstanding relation between corresponding end edges of the side panels. In this manner, it may be seen that a conventional type of flat load bed may be converted to an upwardly opening receptacle type of vehicle body.

The side posts are disposed outwardly of the corresponding side panels and when the side panels are pivoted to their lowered positions, they overlie substantially the entire upper surface of the flooring and have their free end edges disposed in slightly spaced end abutting relation. Accordingly, it may be seen that the side panels when in the lowered positions may be utilized as a flat load bed for the support of loads wider than could be accommodated between the side panels when in the raised positions.

The main object of this invention is to provide a load bed side assembly which may be secured to a conventional type of vehicle load bed and utilized to convert the conventional flat load bed into an upwardly opening receptacle type of vehicle body.

A further object of this invention, in accordance with the immediately preceding object, is to provide a load bed side assembly which may be collapsed with the component parts thereof disposed in lowered positions to form a flat type of load bed which may be used for the support of loads wider than that which could be accommodated between the side panels of the load bed side assembly when in the raised positions.

A final object to be specifically enumerated herein is to provide a load bed side assembly in accordance with the preceding objects which will conform to conventional forms of manufacture, be of simple construction and easy to use so as to provide a device that will be economical-ly feasible, long lasting and relatively trouble free in operation.

These together with other objects and advantages which will become subsequently apparent reside in the details of construction and operation as more fully hereinafter described and claimed, reference being had to the accompanying drawings forming a part hereof wherein like numerals refer to like parts throughout, and in which:

FIGURE 1 is a side elevational view of a tractor-trailer vehicle whose semi-trailer has been modified in accordance with the present invention;

FIGURE 2 is an enlarged transverse vertical sectional view taken substantially upon a plane indicated by the section line 2—2 of FIGURE 1;

FIGURE 3 is an enlarged fragmentary longitudinal vertical sectional view taken substantially upon a plane passing through one side edge portion of the semi-trailer load bed, the side posts of the load bed side assembly being shown in alternate positions;

FIGURE 4 is an enlarged fragmentary transverse sectional view showing the manner in which the side panels are movable to lowered positions directly overlying the flooring of the semi-trailer;

FIGURE 5 is an enlarged fragmentary horizontal sectional view taken substantially upon a plane indicated by the section line 5—5 of FIGURE 2 passing through one of the forward corners of the load bed side assembly;

FIGURE 6 is an exploded perspective view of one corner of the load bed side assembly, parts thereof being broken away and shown in section;

FIGURE 7 is an exploded perspective view of one of the side posts of the load bed side assembly, portions thereof being broken away and shown in section.

Referring now more specifically to the drawings the numeral 10 generally designates a conventional type of tractor trailer vehicle which includes a semi-trailer generally referred to by the reference numeral 12. The semi-trailer 12 includes a main frame generally referred to by the reference numeral 14 from which is dependingly supported a rear wheeled support assembly generally referred to by the reference numeral 16. The forward end of the semi-trailer 12 is pivotally secured to the rear end of the tractor 18 by means of a fifth wheel assembly generally referred to by the reference numeral 20.

It may be seen from FIGURES 2 and 4 of the drawings that the semi-trailer 12 includes a flooring assembly generally referred to by the reference numeral 22. The flooring assembly 22 includes a framework 24 and a flooring surface or cover 26 which may be constructed of any suitable material such as wood.

The framework 24 is provided with the usual rub rail assembly generally referred to by the reference numeral 28 along each side edge thereof and it may be understood that the foregoing description of the vehicle 10 is conventional.

The load bed side assembly of the instant invention is generally referred to by the reference numeral 30 and includes a pair of opposite side panels or sides 32 which extend longitudinally along each side of the framework 24. The side panels 32 may each be of one piece or may be constructed of a plurality of panel sections 34.

The framework 24 has a plurality of aligned sleeve members 36 secured thereto along opposite sides thereof and each of the panel sections 34 has a mounting plate 38 secured to its lower edge 40 by means of suitable fasteners 42. Each of the mounting plates 38 has a plurality of aligned and axially spaced sleeves 44 secured thereto in any convenient manner such as by welding 46 and it will be noted that the sleeves 44 are receivable between adjacent corresponding ones of the sleeves 36. A pivot pin 48 is rotatably received through the sleeves 36 and 44 on each side of the framework 24 and thus it may be seen that each of the side panel sections 34 is pivotally secured to the corresponding side of the framework 24 for movement between upstanding positions such as those illustrated in FIGURES 1 and 2 and lowered generally horizontally disposed positions directly overlying the flooring surface 26. The side panel sections 34 are of a length from their edge portions to the remote edge portions equal to substantially one-half the width of the flooring surface 26 whereby when the side panel sections 34 are disposed in the lowered position they will be substantially coplanar and have their free edge portions disposed in slightly spaced end abutting relation.

With attention now directed to FIGURES 5 and 6 of the drawings it will be seen that a mounting plate 50 is secured to each end edge of the side panels 32 by means of fasteners 52 and that the mounting plates 50 each have a plurality of sleeve members 52 secured thereto in any convenient manner such as by welding 54 in axially aligned and spaced relation. A channel shaped member 55 including a pair of legs 56 and 58 interconnected by means of a bight portion 60 is provided for each of the mounting plates 50 and has a plurality of sleeve members 62 secured thereto in any convenient manner such as by welding 64 in axially aligned and spaced relation. The sleeve members 52 are receivable between adjacent ones of the sleeve members 64 and a pivot pin 66 is rotatably received through the aligned sleeve members 52 and 62. Accordingly, it will be seen that the channel members 55 may be pivoted from the inwardly projecting positions illustrated in FIGURE 5 of the drawings with the channel members opening toward each other to positions with the channel members 55 opening endwise of the corresponding side panel sections 34.

Front and rear end gate members generally referred to by the reference numerals 68 are provided and each includes a plurality of generally horizontally disposed coplanar panels 70 which are rigidly interconnected by means of transverse brace members 72. The opposite end edges of the panels are slidingly embraced by means of the corresponding channel members 55 when the side panels 32 are disposed in their upright raised positions.

Each of the rub rails 28 includes an outer longitudinally extending flange 76 and a plurality of transverse flanges 78 which are secured between the opposite sides of the framework 24 and the corresponding outer flanges 76. In addition, a lower flange 80 is secured between the lower edge portions of the outer flanges 76 and the lower portions of the corresponding opposite sides of the framework 24.

With attention now directed to FIGURES 3, 4 and 7 of the drawings it will be seen that a plurality of side posts each generally referred to by the reference numeral 82 are provided and each of the side posts 82 is provided with a pair of aligned longitudinally extending slots 84 at one end. A mounting sleeve 86 is provided for each support post 82 and is secured within the rub rail 28 on the upper surface of the lower or bottom flange 80 in any convenient manner such as by welding. Each of the mounting sleeves 86 defines an upper bifurcated end portion generally referred to by the reference numeral 88 whose furcations 90 and 92 are provided with aligned apertures 94. Pivot pins 96 are secured through corresponding ones of the apertures 94 and the slots 84 and in this manner, the support posts 82 are pivotally secured to the mounting sleeves 86 for movement about horizontally disposed axes extending transversely of the semi-trailer 12.

A pair of retaining members generally referred to by the reference numerals 98 are provided and each comprises a channel shaped member including a pair of parallel legs 100 interconnected by means of a bight portion 102. Each of the bight portions 102 is apertured as at 104 at points spaced longitudinally therealong and from FIGURE 2 of the drawings it may be seen that the channel members 98 are utilized to embracingly engage the upper portions of the side panel sections 34 and the support posts 82. In this manner, the side panel sections 34 are retained in their upright raised positions against movement of their free ends laterally inwardly away from the upper ends of the support posts 82. A plurality of top bow members generally referred to by the reference numeral 106 are provided and each includes a pair of depending rod-like legs 108 interconnected by means of a curved bight portion 110 and a straight transverse brace 112. The legs 108 of each top bow member 106 are disposed through corresponding ones of the apertures 104 and telescopingly received in the upper ends of the tubular support posts 82.

A central storage rack generally referred to by the reference numeral 114 is secured to the midportion of the main frame 14 and extends transversely thereacross and is adapted to receive the end gate members 68 for storing the latter. In addition, storage channels 116 are secured to the opposite side edge portions of the framework 24 in depending relation and are adapted to receive the channel members 98 for storing the latter. In addition, it is to be understood that the storage rack 114 may also be utilized to store the top bow members 106.

In operation, when it is desired to swing the side panel sections 34 from their lowered positions directly overlying the flooring surface 26, the support posts or side posts 82 are first pivoted from the retracted positions illustrated in FIGURE 3 of the drawings to their upright positions and positioned with their lower ends snugly received within the lower ends of the mounting sleeves 86 whereby the mounting sleeves will retain the side posts 82 in their upright positions. Then, the side panel sections 34 are pivoted to their upright positions and the channel members 98 are withdrawn from their storage positions and disposed over the upper ends of the side panel sections 34 and the side posts 82. Thereafter, the top bow members 106 may be taken from the storage rack 114 and engaged with the channel members 98 and the support posts 82 as illustrated in FIGURE 2 of the drawings. Finally, the end gate members 68 may be withdrawn from the storage rack 114 and slidingly secured between corresponding ones of the channel members 55.

When the load bed side assembly 30 has been disassembled and the side panel sections 34 are disposed in overlying relation to the flooring surface 26, the free end edges of the side panel sections 34 are disposed in slightly spaced end abutting relation. In this manner, the outside surfaces of the side panel sections 34 may be used as a load supporting surface for supporting a load wider than that which may normally be accommodated between the side panels 32 when the latter are in their upright raised positions. Therefore, the semi-trailer 12 may be used to haul many different types of loads. Still further, when the side panels 32 are lowered, the semi-trailer may be loaded and unloaded from the side thereof thereby enabling the semi-trailer to be more quickly loaded and unloaded.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a vehicle load bed of the type including a flooring having opposite side and end edges, a load bed side assembly comprising a pair of elongated longitudinally extending opposite sides, hinge means pivotally securing corresponding side edge portions of said sides to the opposite side edge portions of said flooring for movement between lowered positions overlying the corresponding side portions of said flooring and raised positions with the free edge portions of said sides elevated above said flooring, a plurality of side posts for each of said sides, means pivotally securing corresponding ends of said side posts to said flooring at points spaced along corresponding side edges of said flooring for movement about axes extending transversely of the axis of rotation of the corresponding sides and between lowered positions disposed along the corresponding side of said flooring and raised positions with their free ends elevated above said flooring.

2. The combination of claim 1 wherein said sides are disposed adjacent and substantially parallel the corresponding side posts when the latter and said sides are disposed in the raised positions.

3. The combination of claim 2 including means releasably securing the free ends of said raised sides from swinging movement away from the corresponding raised side posts.

4. The combination of claim 1 including end gate support means secured to at least one pair of corresponding end edge portions of said sides, at least one end gate removably engageable with said support means when said sides are raised for securement of said end gate in upstanding relation between corresponding end edges of said sides.

5. The combination of claim 4 wherein said support means each comprises a channel member slidably embracing opposite side edge portions of said end gate.

6. The combination of claim 5 including means pivotally securing said channel members to the corresponding end edge portions of the corresponding sides for movement about axes generally paralleling the longitudinal axes of said channel members and said corresponding end edge portions between operative positions opening toward each other and inoperative positions opening endwise of the corresponding side.

7. The combination of claim 6 wherein the last mentioned pivotal securing means includes means removably securing each of said channel members to the corresponding side.

8. The combination of claim 1 including top bow members secured between the upper ends of at least one pair of said side posts.

9. The combination of claim 1 wherein said hinge means comprises a piano type hinge assembly extending substantially the entire length of each of said sides.

10. The combination of claim 1 wherein said side posts are of a length less than the spacing between the axes of rotation of adjacent posts longitudinally of said flooring.

11. The combination of claim 1 wherein said sides and said posts are disposed at substantially right angles to said flooring when raised.

12. The combination of claim 1 wherein said means pivotally securing said posts to said flooring includes means for releasably securing said posts in their raised positions.

13. The combination of claim 1 wherein the posts on each side of said flooring are substantially longitudinally aligned when in the lowered positions and are disposed below the upper surface of said flooring.

14. The combination of claim 1 wherein said sides are of a width from their free edges to the remote edges so as to be disposed in substantially coplanar relation with their free edges adjacent each other when in their lowered positions.

15. In combination with a vehicle load bed of the type including a flooring having opposite side and end edges, a load bed side assembly comprising at least one elongated longitudinally extending side, hinge means pivotally securing corresponding side edge portions of said side to one edge portion of said flooring for movement between a lowered position overlying a corresponding side portion of the flooring and a raised position with the free edge portion of said side elevated above said flooring, a plurality of side posts, means pivotally securing corresponding ends of said side posts to said flooring at points paced along said one side edge thereof for movement about axes extending transversely of the axis of rotation of said side and between lowered positions disposed along said one side of said flooring and raised positions with their free ends elevated above said flooring.

16. The combination of claim 1 wherein said side posts, when in the lowered positions, are disposed beneath the upper edges of said load bed side assembly when the latter is in the lowered position overlying the corresponding portion of said flooring.

References Cited in the file of this patent

UNITED STATES PATENTS

| | | |
|---|---|---|
| 277,801 | Stafford | May 15, 1883 |
| 337,105 | Withrow | Mar. 2, 1886 |
| 953,509 | Bird | Mar. 29, 1910 |
| 1,022,266 | Saltzman | Apr. 2, 1912 |
| 2,720,413 | Halverson | Oct. 11, 1955 |

FOREIGN PATENTS

| | | |
|---|---|---|
| 844,864 | Germany | July 24, 1952 |